United States Patent
Chen et al.

(10) Patent No.: US 8,237,764 B1
(45) Date of Patent: Aug. 7, 2012

(54) LOCAL VIDEO FEEDBACK FOR VIDEOCONFERENCING

(75) Inventors: Milton Chen, San Jose, CA (US); Erika Chuang, Los Gatos, CA (US)

(73) Assignee: VSee Lab, Inc., San Jose, CA (US)

( * ) Notice: Subject to any disclaimer, the term of this patent is extended or adjusted under 35 U.S.C. 154(b) by 1578 days.

(21) Appl. No.: 11/699,796

(22) Filed: Jan. 29, 2007

(51) Int. Cl.
*H04M 11/00* (2006.01)

(52) U.S. Cl. ...................................... 348/14.01; 709/204

(58) Field of Classification Search ..... 348/14.01–14.16
See application file for complete search history.

(56) References Cited

U.S. PATENT DOCUMENTS

| | | | |
|---|---|---|---|
| 5,674,003 A * | 10/1997 | Andersen et al. ............. | 709/228 |
| 6,249,318 B1 | 6/2001 | Girod et al. | |
| 6,453,336 B1 | 9/2002 | Beyda et al. | |
| 6,680,745 B2 | 1/2004 | Center, Jr. et al. | |
| 7,692,680 B2 * | 4/2010 | Graham et al. ............ | 348/14.01 |
| 2003/0039216 A1 * | 2/2003 | Sheldon et al. ............ | 348/14.08 |
| 2007/0120958 A1 * | 5/2007 | Sunahara ................... | 348/14.01 |

OTHER PUBLICATIONS

"Polycom PVX" (2006) http://www.polycom.com/products_services/1,,pw-7953,000.html.
"Tandberg Web Conferencing" (2006) http://www.tanberg.net/products/webconferencing.jsp.

* cited by examiner

*Primary Examiner* — Curtis Kuntz
*Assistant Examiner* — Maria El-Zoobi
(74) *Attorney, Agent, or Firm* — Patterson & Sheridan, LLP (57) ABSTRACT

A system and method enabling a local party to see how a remote party is viewing him/her during a videoconference is provided. This is accomplished by predicting and changing the local video to a similar video quality level as the video quality displayed with which the local video is displayed on a remote display. This process occurs without any input from the parties/user(s). Instead the prediction and changing of the local video occurs in an automatic fashion and continuously.

20 Claims, 6 Drawing Sheets

LOCAL VIDEO FEEDBACK FOR VIDEOCONFERENCING

FIELD OF THE INVENTION

The invention relates generally to videoconferencing. More particularly, the present invention relates to methods and systems for videoconferencing with integrated therein feedback, prediction and image degrading mechanisms to continuously display on the local video display a predicted video, which simulates how a local party is viewed at a remote system.

BACKGROUND OF THE INVENTION

Figure 1:
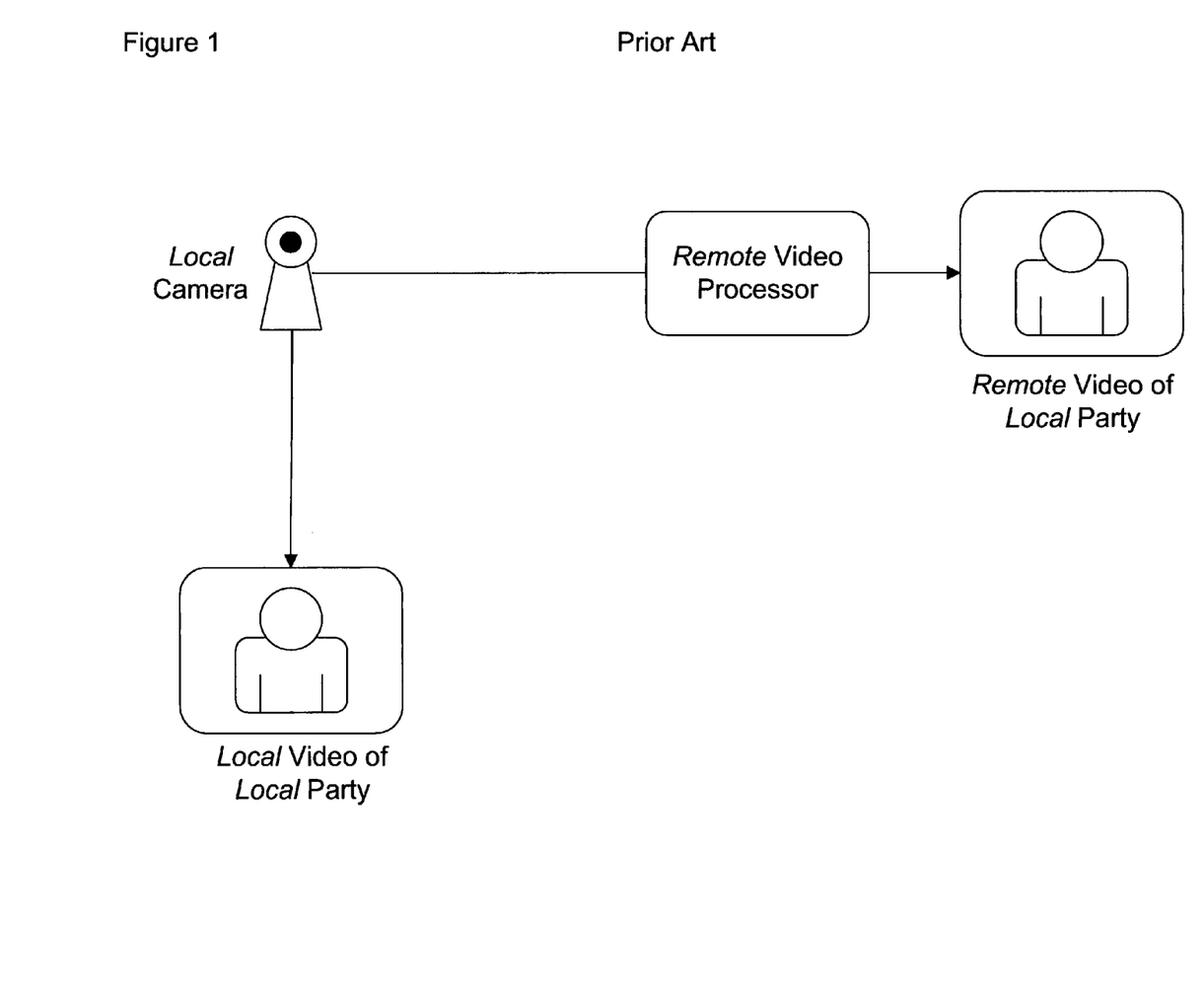
FIG. 1 shows a videoconferencing system according to a prior art example. The local video of the local party comes directly from the local camera. The grey box (remote video of local party) indicates lower video quality than the white box (local video of local party)

In current video conferencing systems the local video is streamed directly from the local camera to the local display (see FIG. 1). With the current technology, the local video is always shown in great quality. In contrast, the video from the remote location often appears with many artifacts. The remote video quality degradation is due to network artifacts such as packet lost, congestion, delay, jitter, or inadequate computation processing resources such slow CPU, shortage of memory, etc.

Since the local video is always shown in great quality independent of network conditions, the local party may actually think that the remote party can see him/her/them clearly when in fact the remote party might see him/her/them with heavy video/audio distortion or the remote party might not see the local party at all. This often forces the remote party to ask the local party to repeat himself, herself or themselves, results in miscommunication or leads to irritating situations. A remote party may not be able to ask the local party to repeat himself, herself or themselves until the network condition improves. Network conditions may not improve until several minutes later during the videoconferencing, which is highly disruptive to the conversation. Sometimes the remote party may not even know that they missed something, for example, the local party may smile at the remote party, and this smile may be lost or distorted due to network conditions. Such conditions are extremely hurtful to the conversation, where bad video is often worse than no video at all.

Some systems include feedback mechanisms such as a symbol (e.g. a bright yellow lighting mark) or text messages on the remote video's display in case the network condition is poor. Unfortunately, such feedback mechanisms still make it difficult for a local party to learn the meaning of symbols or text messages since it does not capture the actual video degradation. Furthermore, symbols or text do not capture the varying degree of network degradation of video quality. It would therefore be considered an advance in the art to develop new systems and methods whereby the local party actually sees how he/she/them is/are viewed on a remote video display during a videoconference in a continuous manner. Such a continuous feedback system would allow the party to continuously adjust and adapt to how he/she/them is/are seen to maximize communication effectiveness; e.g. delay smiling until after a network congestion has passed.

SUMMARY OF THE INVENTION

The invention enables a local party to see how a remote party is viewing himself, herself or themselves during a videoconference. This is accomplished by predicting and changing the local video to a similar video quality level as the video quality displayed on a remote display. This process occurs without any input from the involved parties. Instead the prediction and changing of the local video occurs in an automatic fashion and continuously.

The present invention is a video-feedback mechanism in which the local party obtains continuous video-feedback regarding the network conditions and/or remote system. The predicted and degraded local video represents the state of the video displayed remotely and is a function of the network conditions and/or remote system.

A party is defined as one or more users at either the local or remote location. Each party and even each user in a party could have more than one camera and/or display.

BRIEF DESCRIPTION OF THE FIGURES

The present invention together with its objectives and advantages will be understood by reading the following description in conjunction with the drawings, in which.

DETAILED DESCRIPTION OF THE INVENTION

The videoconferencing system includes a local system with a local party, a local video camera, a local video display for the local party, and a local video processor to process the local video from the local video camera. It further includes a remote system for the remote party with a remote video display for the remote party, and a remote video processor to process the local video received from the local video camera. A network connects at least the local video camera, the local video display, the local video processor, the remote video display and the remote video processor. The videoconferencing system further includes a feedback mechanism from the remote video processor to the local video processor. This feedback carries information regarding the remote system and the network, such as network condition statistics and processor, memory or input/output device load of the remote system.

With the obtained feedback as input, a prediction and image degrading mechanism is integrated in the system to predict the remote video degradation between the local video displayed on the remote video display and the local video displayed on the local video display. Once a prediction is obtained, this mechanism then degrades the quality of the local video, which is displayed on the local video display. The predicted and degraded video is then displayed through a displaying mechanism in a continuous manner on the local video display to the local party. The preferred location of the prediction and imaging degrading mechanism is at the local site since the goal of these modules/mechanisms is to reduce the video quality from the local camera to the local display.

Figure 2:
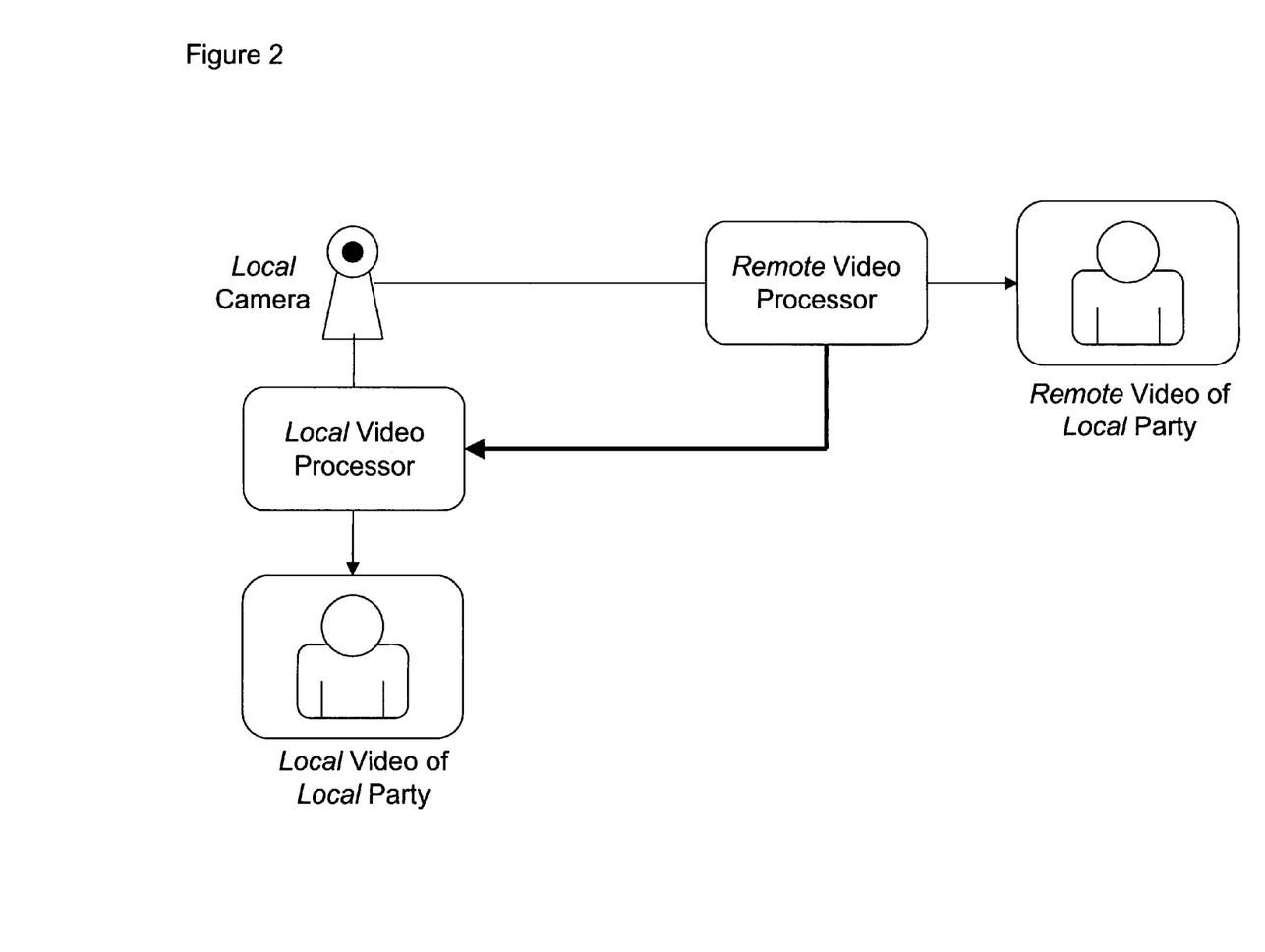
FIG. 2 shows a videoconferencing system according to the present invention. The local video of the local party includes feedback information from the network and/or remote system. The local video of the local party is predicted and changed to represent how a remote party views the local party. The grey boxes (remote video of local party and local video of local party) indicate similar video quality, though of lower quality than the white box as in FIG. 1.

Before implementation of this invention the local video displayed on the remote display is degraded in quality compared to the local video displayed on the local display as shown in FIG. 1. After implementation of this invention similar video quality is achieved as shown in FIG. 2 by the two grey boxes, i.e. local video of local party and remote video of local party having the same shade of grey. This is in contrast to FIG. 1 where the two boxes of the local video of local party and the remote video of local party are different, i.e. the local video of the local party is of higher quality (white box) than the remote video of the local party (grey box). In the example of FIG. 2 both grey boxes indicate lower video quality than the white box in FIG. 1.

There could be several factors that influence the degradation of the local video at the remote party end. For example, network data transmission-delay, transmission loss, transmission jitter, and the condition of the general and/or video processor such as processing load, memory usage, etc. Such information could be used as feedback to the prediction and degradation mechanism, which could contain several blocks. Example of block components of the prediction and degradation mechanism are a frame rate differential buffer, video compression, a delay buffer, a prediction buffer on the network condition statistics, a prediction video decompression based on the processor memory or input/output load of the remote system, a image warping module or any combination thereof. These blocks could be used in various combinations of which two examples are discussed herein, but first some examples of feedback information are discussed.

A. Data Packet Transmission-Delay

The data packet transmission-delay is measured as how much time it takes for a packet to transmit and travel from one party/user terminal to another. This delay could range from less than 1 millisecond to more than 30 seconds. Some examples are:

1 ms—party/user terminals located on the same broadband local area network     30 ms—party/user terminals located within same city, connected via broadband     100-150 ms—party/user terminals located within the U.S., connected via broadband     250-350 ms—party/user terminals located within the world, connected via broadband     >350 ms—party/user terminals connected with Dial Up Modem, satellite, or cellular data network B. Data Packet Transmission Loss The video data stream is converted into data packets and transmitted over the network. Data packets might get lost due to network problems such congestions. Such a loss ratio might range from 0% to 100%, for example:

if the data packets loss ratio is 0%, then the remote video quality is as good as the local video quality, assuming no other adverse network or processing conditions     if the data packet loss ratio is between 0% and 100%, then the remote video of a local party is being affected. In such a case the local party should be made aware how the local party is being displayed by the remote party.

if the loss is 100%, then no video stream is received and the local party should be made aware that the remote party can no longer see him, her or them.

Data Packets could be lost in different manners, for example:

1 out of every 10 data packets is lost (10% loss), which could be argued that the video quality may still be acceptable. This manner of data packet loss might range from 0% to 100%.

10 consecutive data packets are lost in 100 (10% loss), which could be argued that the video quality might be severely degraded. This manner of data packet loss might range from 0% to 100%.

The data packet loss ratio and loss manner must be fed back from the data packet receive terminal to the data packet transmit terminal. The data packet loss information feedback might be delayed from 0 to >30 sec, depending on the network conditions.

One way to combat the data packet loss problem is to re-transmit the lost data packets; but this will increase the need for more data transmission bandwidth and increase video transmission delay. Another way is to transmit redundant data packets, which will also increase the need for more data transmission bandwidth and increase video transmission delay. Either method or both methods could be used. In case of the latter the method could be decided dynamically at runtime depending on the exact scene and network conditions.

C. Video Data Processing Unit Condition

An impaired processing unit can also cause video quality degradations. If the processing unit is slow or load saturated, it cannot process the received and transmitted video information fast enough to render satisfactory videoconferencing experience. Significant data packet processing delays ranges from <1 ms to >30 seconds and/or data packet loss ranges from 0% to 100% could result from the processing unit being unable to fully perform its functions. This impaired condition could be temporary or permanent.

Figure 3:
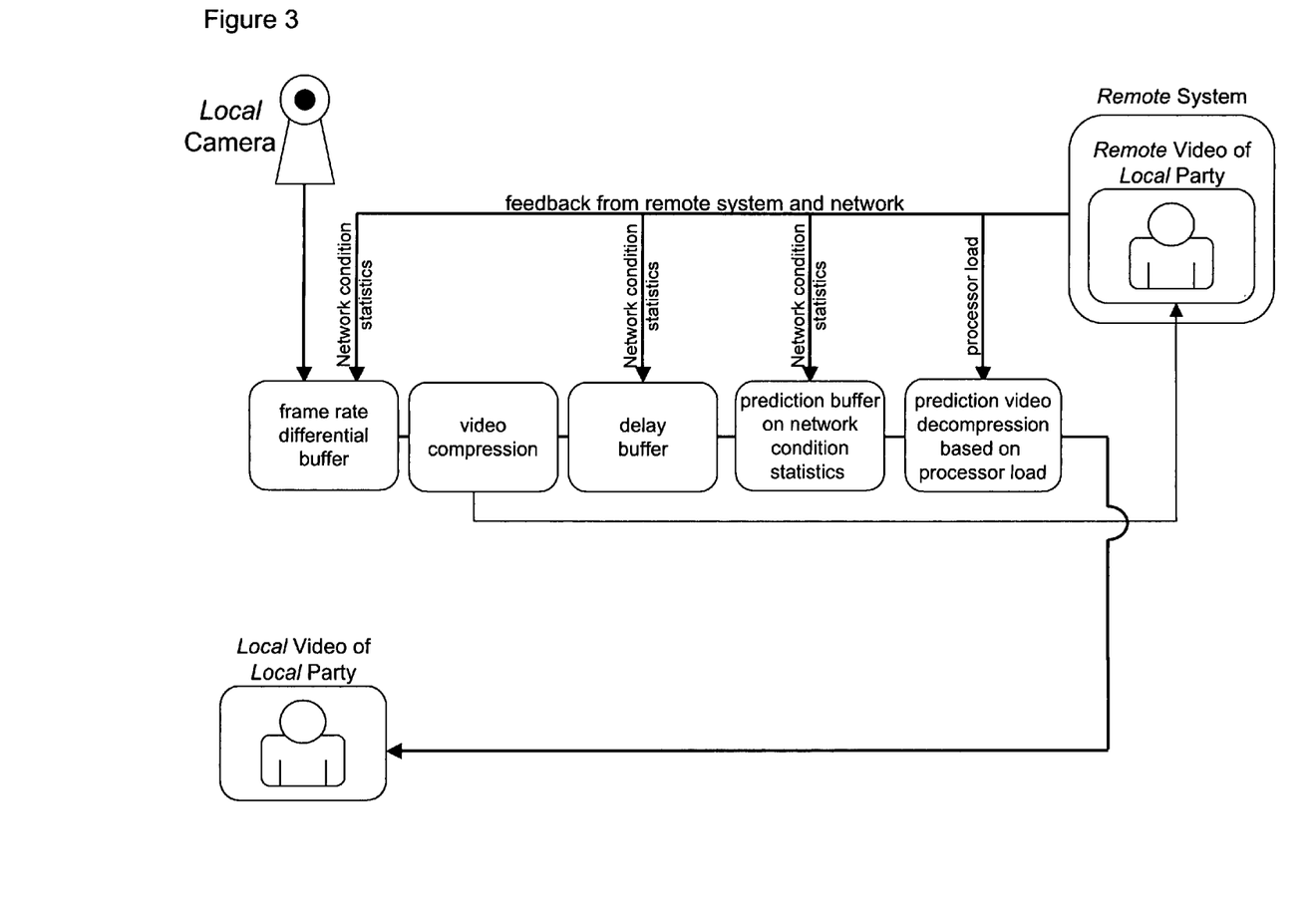
FIGS. 3-4 show two examples of implementation according to the present invention.
Figure 4:
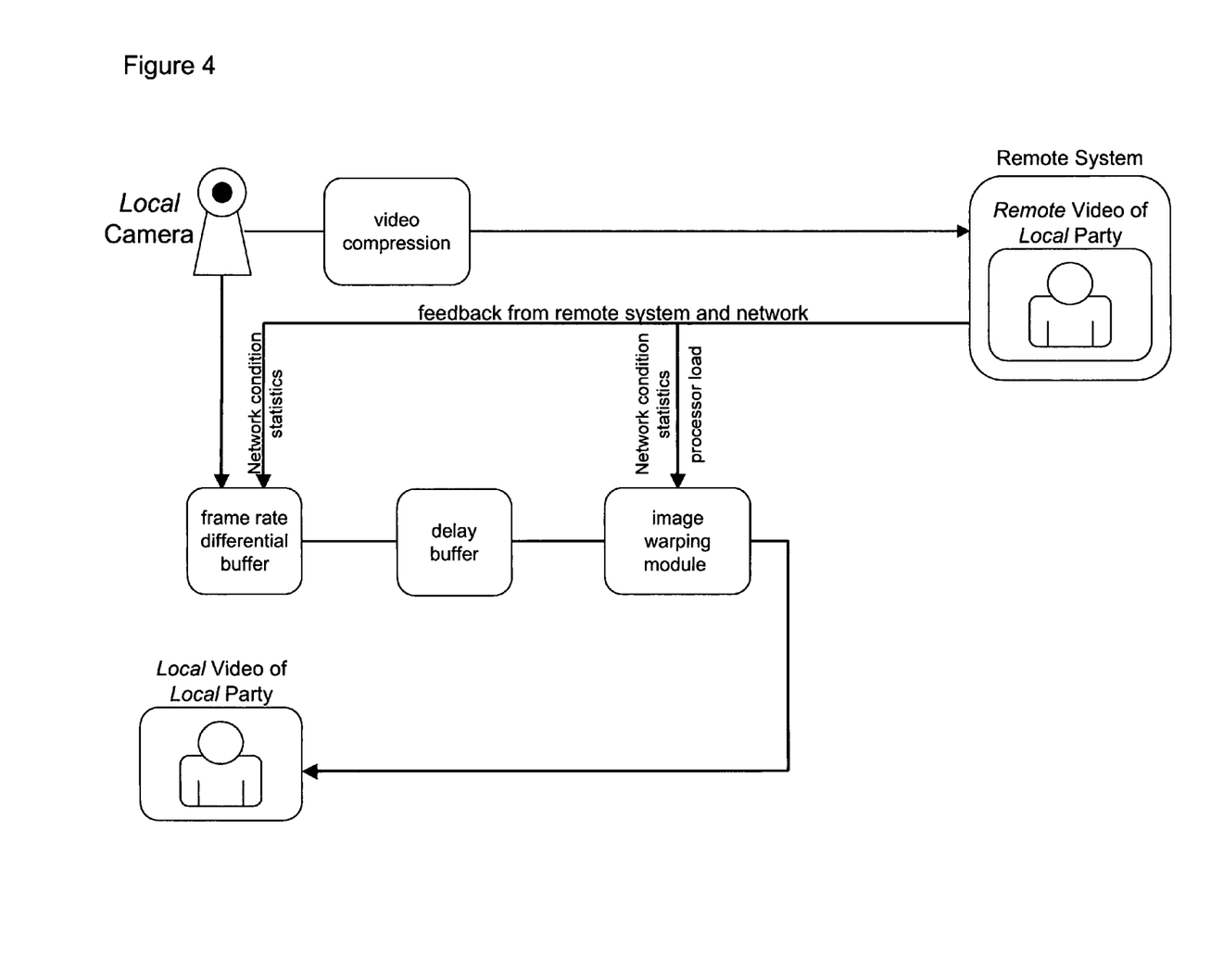

FIGS. 3-4 shows two example implementations of the invention. One implementation utilizes video compression and predictive video decompression as shown in FIG. 3. The other implementation uses an image-warping module as shown in FIG. 4. The implementation in FIG. 3 will render more exact mimicking of the local video of the local party to the remote video of the local party, in comparison to image-warping module method. However, the method of FIG. 3 may require a higher computation load in comparison to image-warping module method.

The following sections describe the individual blocks/components and their interactions as shown in the embodiments of FIGS. 3-4.

Frame Rate Differential Buffer

Cameras often would produce video of a certain frame rate, and the remote system, together with network limitations, may limit the actual frame rate delivered to the remote party. A frame rate differential buffer reduces the frame rate of the local video of the local party to match the actual video frame rate received at the remote system.

Delay Buffer

The Delay Buffer is used to insert delay into local video to the local party. The inserted delay preferably matches the amount of network delay at any given time. If the delay is less than a certain predetermined or automatically determined threshold (e.g. 200 ms), no Delay is inserted. By deliberately delaying the local video of local party, the local party can determine how the remote party is viewing the local party. The reason that network delays less than a certain threshold is not inserted in the delay buffer is that remote parties/users typically cannot detect delays less than around 250 ms. However, inserting this amount of delay into the local delay buffer results in a noticeable and annoying lag of the local video, which negatively impact the local video experience. This implementation only inserts the delay to reflect adverse network conditions. Thus, in the typical operation, no delay is inserted until an adverse network event.

Video Compression

The video compression block is used to perform video compression for transmission of the local video to the remote party.

Prediction Buffer

The prediction buffer is used to manipulate the compressed local video data utilizing the network condition statistics feedback from the remote terminal. A calculated prediction is made to mimic network condition likely experienced by the remote terminal. For example, from the network conditions feedback, if 10 percent of the packets are known to be lost, then 10 percent of the packets are removed from the prediction buffer, simulation the condition of network packet loss for the local video of the local party. The feedback information may contain aggregate statistics, a probabilistic profile, or the exact packets that were lost.

Predictive Video Decompression

The predictive video decompression block is used to take the output of the prediction buffer, which is the compressed local video data that has been altered to mimic degradation due to network conditions. This block will decompress the predication buffer output, utilizing the remote terminal processor, memory, and IO device (input/output) load information. The output of this block is displayed as local video of the local party.

Image Warping Module

The image warping module/block is used to take the output of delay buffer and frame rate differential buffer. Subsequently with the network condition statistics and remote processor, memory, and IO device load information, this module renders or warps certain pixel or blocks of pixels, which results in erroneous representation of the video images in certain localized locations. The result of the warping is to mimic the effect of adverse network or system conditions. The output of this block is displayed as local video of the local party.

Figure 5:
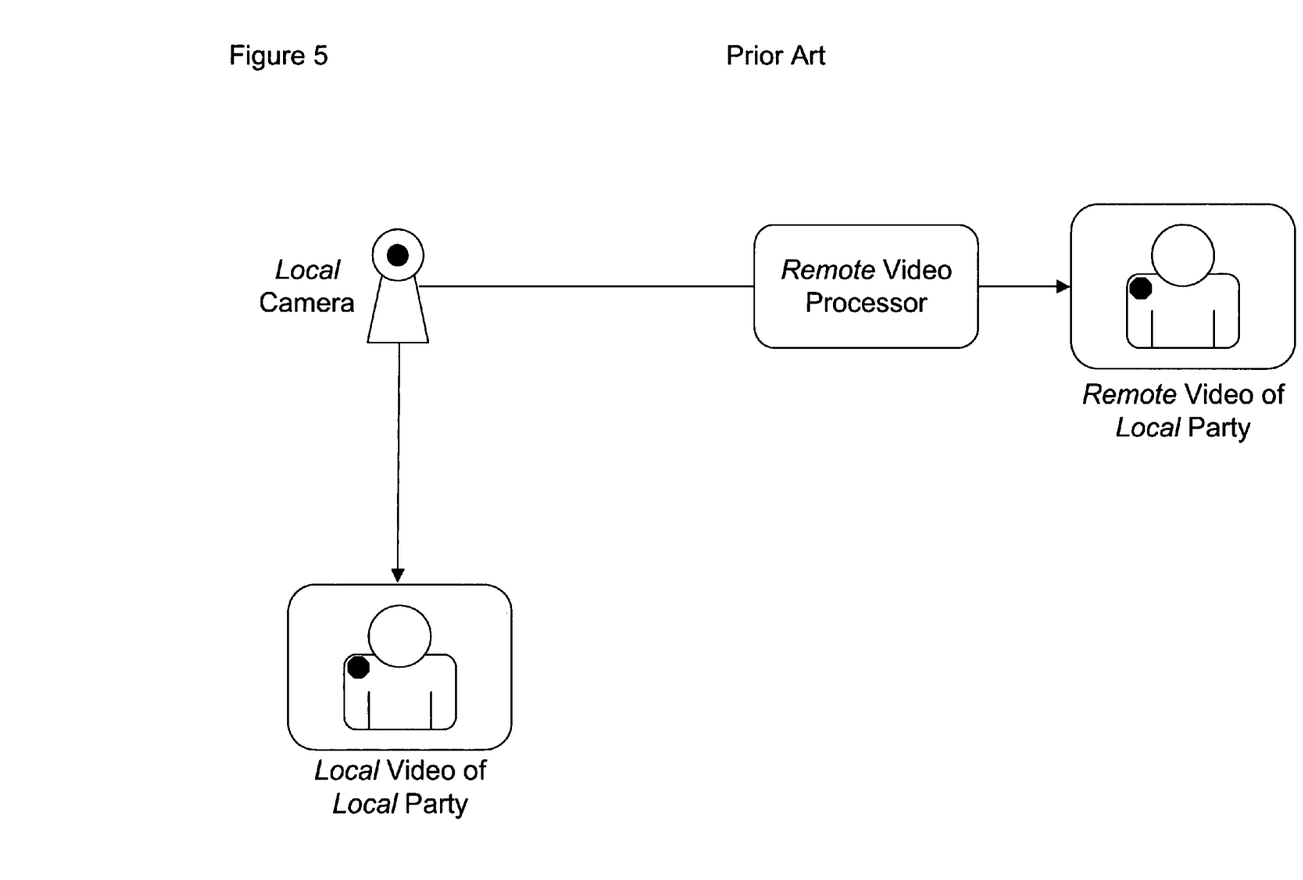
FIG. 5 shows a prior art example with the same view of the local party to both the local and remote display, either both mirrored or both not mirrored.
Figure 6:
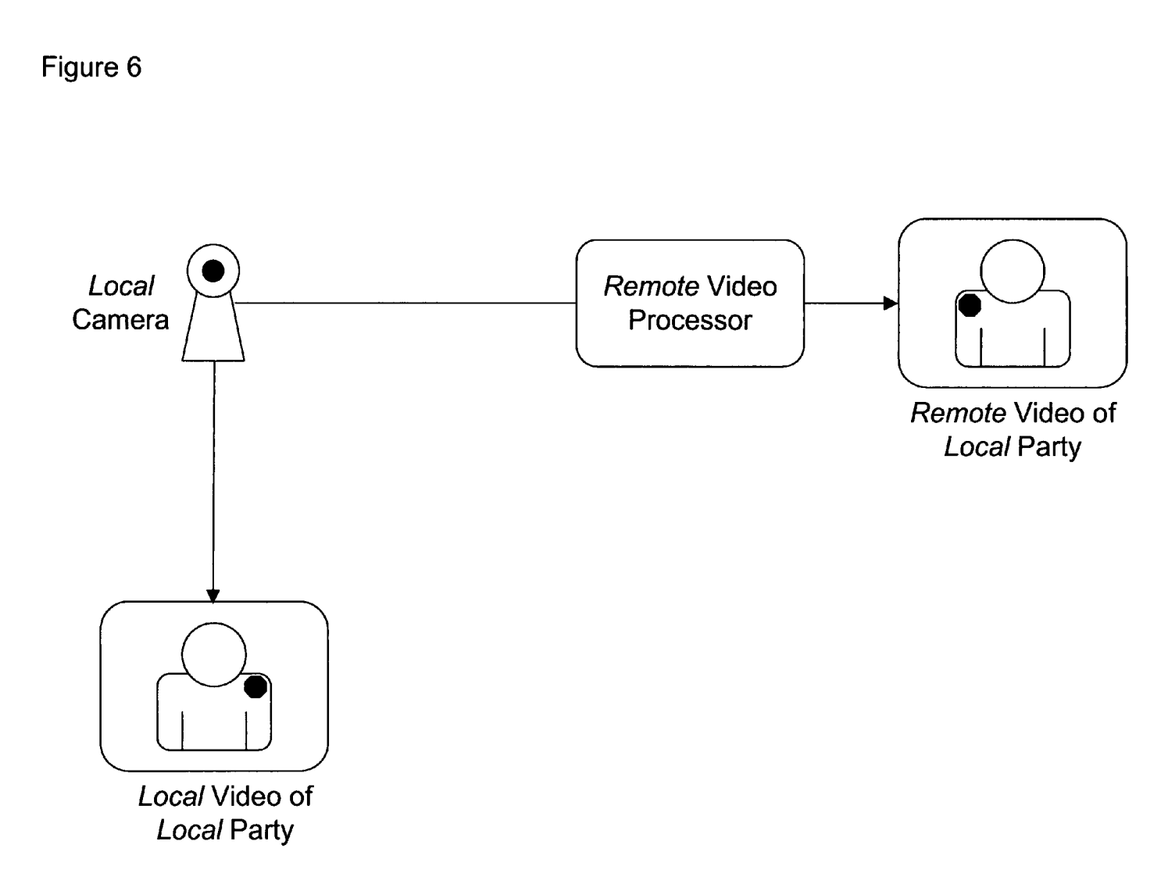
FIG. 6 shows a mirroring mechanism according to the present invention to mirror the video of the local party to match the actual position/presence of the local party.

An additional aspect of the invention is the local video mirror (FIG. 6). This local mirror is implemented such that local video is mirrored in for example the image-warping module or the predictive decompression module. This mirroring mechanism allows the local video to appear like a mirror and yet the remote people will still see the local person from the correct perspective. Existing videoconferencing systems present the same view of the local party to both the local video and the remote video; either both are mirrored or both are not mirrored (FIG. 5).

The present invention has now been described in accordance with several exemplary embodiments, which are intended to be illustrative in all aspects, rather than restrictive. Thus, the present invention is capable of many variations in detailed implementation either in hardware and/or software, which may be derived from the description contained herein by a person of ordinary skill in the art. For example, there could be multiple locations each having one or more parties. In those cases, the local video feedback could be a function of (a) the worst case of all remote locations, (b) a picture-in-picture of local video attached to each remote location video, (c) or two classes of remote site. For the latter one have four remote sites and two of those sites have good networks and the other two have bad networks. The present invention could then use two different methods to stream video to the good sites and to the bad sites, and then one would show how the good and bad sites can see the local sites/parties, respectively. All such variations are considered to be within the scope and spirit of the present invention as defined by the following claims and their legal equivalents.

What is claimed is:

1. A videoconferencing system, comprising:
a local system that includes a local video camera that captures a local video, a local video processor to process the local video from said local video camera, and a local video display that displays the processed local video;
a network connecting at least said local video camera, said local video display, and said local video processor to a remote video processor and a remote video display;
a feedback mechanism configured to receive feedback from said remote video processor regarding said network; and
a prediction and image degrading mechanism configured to predict, based on said received feedback, an amount of remote video degradation between said local video displayed on said remote video display and said local video displayed on said local video display and to degrade the quality of said local video displayed on said local video display based on said predicted amount of remote video degradation.

2. The videoconferencing system as set forth in claim 1, wherein said feedback comprises network condition statistics and is further based on processor, memory, and/or input/output device load of a remote system that includes the remote video processor and the remote video display.

3. The videoconferencing system as set forth in claim 1, wherein said prediction and image degrading mechanism comprises a frame rate differential buffer, a video compression unit, a delay buffer, a prediction buffer on network condition statistics, a prediction video decompression based on processor, memory, and/or input/output device load of a remote system that includes the remote video processor and the remote video display.

4. The videoconferencing system as set forth in claim 1, further comprising a mirroring mechanism to mirror said predicted and degraded video on said local video display.

5. The videoconferencing system as set forth in claim 1, wherein the local system includes more than one camera.

6. The videoconferencing system as set forth in claim 1, wherein the local system includes more than one video display.

7. The videoconferencing system as set forth in claim 1, wherein the quality of said local video displayed on said local video display is degraded based on said predicted amount of remote video degradation when the received feedback is above one or more thresholds.

8. A videoconferencing system, comprising:
a local system that includes a local video camera that captures a local video, a local video processor to compress the local video from said local video camera, and a local video display that displays the local video;
a network connecting at least said local video camera, said local video display, and said local video processor to a remote video processor and a remote video display;
a video compression mechanism to compress the local video;
a feedback mechanism configured to receive feedback from said remote video processor regarding said network; and
a prediction and decompression mechanism configured to predict, based on said received feedback, an amount of remote video degradation between said local video displayed on said remote video display and said local video displayed on said local video display and to decompress said compressed local video displayed on said local video display based on said predicted amount of remote video degradation.

9. The videoconferencing system as set forth in claim 8, wherein said prediction and decompression mechanism comprises a frame rate differential buffer, a delay buffer, a prediction buffer on network condition statistics, a prediction video decompression based on processor, memory, and/or input/output device load of a remote system that includes the remote video processor and the remote video display.

10. The videoconferencing system as set forth in claim 8, further comprising a mirroring mechanism to mirror said decompressed video on said local video display.

11. The videoconferencing system as set forth in claim 8, wherein said local system has more than one camera.

12. The videoconferencing system as set forth in claim 8, wherein said local system has more than one video display.

13. The videoconferencing system as set forth in claim 8, wherein the local video displayed on said local video display is decompressed based on said predicted amount of remote video degradation when the received feedback is above one or more thresholds.

14. The videoconferencing system as set forth in claim 8, wherein said feedback comprises network condition statistics and is further based on processor, memory, and/or input/output device load of a remote system that includes the remote video processor and the remote video display.

15. A method of providing video feedback in a videoconferencing system, the system comprising:
a local system that includes a local video camera that captures a local video, a local video processor to process the local video from said local video camera, and a local video display that displays the processed local video; and
a network connecting at least said local video camera, said local video display, and said local video processor to a remote video processor and a remote video display;
said method comprising the steps of:
receiving feedback from said remote video processor regarding said network,
predicting, based on said received feedback, an amount of remote video degradation between said local video displayed on said remote video display and said local video displayed on said local video display, and
degrading the quality of said local video displayed on said local video display based on said predicted amount of remote video degradation.

16. The method as set forth in claim 15, wherein said feedback comprises network condition statistics and is further based on processor, memory, and/or input/output device load of a remote system that includes the remote video processor and the remote video display.

17. The method as set forth in claim 15, further comprising the step of mirroring said predicted and degraded video.

18. The method as set forth in claim 15, wherein the local system includes more than one camera.

19. The method as set forth in claim 15, wherein the local system includes more than one video display.

20. The method as set forth in claim 15, wherein the step of degrading the quality of said local video displayed on said local video display based on said predicted amount of remote video degradation is performed when the received feedback is above one or more thresholds.

* * * * *